US012637343B2

(12) United States Patent
Deeds et al.

(10) Patent No.: US 12,637,343 B2
(45) Date of Patent: May 26, 2026

(54) METHOD FOR HANDS FREE AUTO-FILLING ONE OR MORE WATER RESERVOIRS OF A LIQUID DISPENSER AND A RELATED APPARATUS

(71) Applicant: CRYSTAL MOUNTAIN INTERNATIONAL LIMITED, Kowloon (HK)

(72) Inventors: John E. Deeds, Johnstown, OH (US); Dennis Laurier Rivard, Alberta (CA)

(73) Assignee: CRYSTAL MOUNTAIN INTERNATIONAL LIMITED, Hong Kong (HK)

( * ) Notice: Subject to any disclaimer, the term of this patent is extended or adjusted under 35 U.S.C. 154(b) by 268 days.

(21) Appl. No.: 18/113,099

(22) Filed: Feb. 23, 2023

(65) Prior Publication Data

US 2024/0286882 A1 Aug. 29, 2024

(51) Int. Cl.

*B67D 1/08* (2006.01)
*B67D 1/00* (2006.01)
*B67D 3/00* (2006.01)
*B67D 1/12* (2006.01)

(52) U.S. Cl.

CPC ......... *B67D 1/0009* (2013.01); *B67D 1/0871* (2013.01); *B67D 3/0038* (2013.01); *B67D 1/0857* (2013.01); *B67D 1/0895* (2013.01); *B67D 2001/1261* (2013.01)

(58) Field of Classification Search

CPC .. B67D 1/0009; B67D 1/0871; B67D 1/0857; B67D 1/0895; B67D 1/12; B67D 2001/1261; B67D 3/0038; B67D 2001/0095

See application file for complete search history.

(56) References Cited

U.S. PATENT DOCUMENTS 4,958,747 A * 9/1990 Sheets .................. B67D 3/0009 222/146.6
5,439,145 A * 8/1995 Salkeld .................. B67D 3/041 222/189.09
5,540,355 A * 7/1996 Hancock .............. B67D 1/0802 222/64

(Continued)

FOREIGN PATENT DOCUMENTS

GB 2561223 10/2018
WO WO-2013030753 A2 * 3/2013 ........... B67D 1/0009

*Primary Examiner* — Nicolas A Arnett

(74) *Attorney, Agent, or Firm* — Merek, Blackmon & Voorhees, LLC

(57) ABSTRACT

A method of hands free auto-filling of one or more water reservoirs of a liquid dispensing apparatus in which one or more conditions of the liquid dispensing apparatus indicative of the position of one or more float valves operably associated with the one or more water reservoirs of the liquid dispensing apparatus is sensed to determine if the one or more water reservoirs have been filled. A water dispensing assembly preferably includes a liquid manifold, a cold water reservoir, a dispensing nozzle, a pump head, an outlet port supplying water to a hot water reservoir and/or a venting assembly including a vent port and a float valve. Movement of the float valve from a position where the vent port is open to a position where the vent port is closed varies at least one condition of a liquid dispenser during filling of the one or more reservoirs enabling hands free auto-filling.

21 Claims, 14 Drawing Sheets

(56) References Cited

U.S. PATENT DOCUMENTS

| | | | | |
|---|---|---|---|---|
| 6,435,379 | B2 * | 8/2002 | Tansley | B67D 1/0009 222/464.2 |
| 7,097,072 | B2 * | 8/2006 | Tan | B67D 3/0029 222/189.06 |
| 7,775,397 | B2 * | 8/2010 | Rivard | B67D 3/0025 141/303 |
| 8,887,955 | B2 * | 11/2014 | Walton | B67D 1/10 222/382 |
| 9,527,639 | B2 * | 12/2016 | Walton | B65D 51/222 |
| 9,527,714 | B2 * | 12/2016 | Walton | B67D 1/10 |
| 9,815,678 | B2 * | 11/2017 | Furberg | B67D 1/12 |
| 10,752,483 | B1 * | 8/2020 | Pittaway | B67D 1/04 |
| 10,781,093 | B2 * | 9/2020 | Walton | B67D 7/02 |
| 11,445,851 | B2 * | 9/2022 | Colonna | A47J 31/461 |
| 11,857,107 | B2 * | 1/2024 | Walton | A47J 31/465 |
| 12,071,337 | B2 * | 8/2024 | Walton | B67D 1/0078 |
| 2005/0029300 | A1 * | 2/2005 | Walton | B67D 3/0032 222/185.1 |
| 2007/0278250 | A1 * | 12/2007 | Pittaway | B67D 3/0032 222/185.1 |
| 2008/0011660 | A1 * | 1/2008 | Walton | B67D 3/0038 210/764 |
| 2013/0048681 | A1 * | 2/2013 | Walton | B67D 1/10 222/512 |
| 2018/0085723 | A1 * | 3/2018 | Perkins | B67D 1/0075 |
| 2022/0402742 | A1 * | 12/2022 | Pittaway | B67D 1/10 |

* cited by examiner

METHOD FOR HANDS FREE AUTO-FILLING ONE OR MORE WATER RESERVOIRS OF A LIQUID DISPENSER AND A RELATED APPARATUS

FIELD OF THE INVENTION

The present invention is directed to one or more components for a dispensing apparatus (e.g., a removable water dispensing assembly) and/or a dispensing apparatus for dispensing consumable liquids including but not limited to cold water (e.g., below an ambient temperature), ambient temperature water, hot water (e.g., above an ambient temperature) and/or a flavored beverage. The flavored beverage could be a hot flavored beverage (e.g., above an ambient temperature), a cold flavored beverage (e.g., below an ambient temperature) or an ambient temperature flavored beverage.

A preferred form of the present invention is directed to one or more methods for hands free auto-filling of one or more water reservoirs or containers of the liquid dispensing apparatus. Preferably, the liquid dispensing apparatus is a free standing device that includes all components necessary to dispense a desired consumable liquid. Alternatively, the liquid dispensing apparatus could be a unit connected to the existing plumbing of a building structure in which the liquid dispensing apparatus is located to supply water to the liquid dispensing apparatus (i.e., the existing plumbing is the source of water for the liquid dispenser).

Preferred methods of hands free auto-filling of one or more water reservoirs or containers of the liquid dispensing apparatus include sensing one or more conditions of the liquid dispensing apparatus indicative of the position of one or more float valves operably associated with the one or more water reservoirs or containers of the liquid dispensing apparatus to determine if the one or more water reservoirs or containers have been filled.

In a preferred embodiment, one or more venting assemblies including a housing having a vent port and a float valve moveable in the housing are operably connected to one or more water reservoirs or containers wherein the float valve, during filling or refilling, is moveable between a first position in which the vent port is open and a second position in which the vent port is closed. During filling or refilling of the one or more reservoirs, a control system monitors at least one condition of the dispensing apparatus that varies as the float valve moves from the first or open position to the second or closed position to automatically shut off or discontinue the flow of water to the one or more reservoirs when the float valve moves to the second or closed position as the one or more water reservoirs have been filled or refilled to a predetermined level.

In a most preferred embodiment, an amperage level of a pump supplying water to the one or more water reservoirs or containers of the liquid dispensing apparatus is monitored to control filling of the one or more water reservoirs or containers of the liquid dispensing apparatus wherein the amperage level of the pump varies as one or more float valves operably associated with the one or more reservoirs move between an open position in which a vent port is open and a closed position in which the vent port is sealed or closed. When the amperage level of the pump reaches or exceeds a predetermined level indicating that the one or more float valves are in the closed position and the one or more of the water reservoirs or containers of the liquid dispensing apparatus have been filled to a predetermined level, the pump is automatically deactivated or shut off.

In a most preferred embodiment, a pump disposed in the dispensing apparatus supplies water to one or more water reservoirs or containers and the one or more water reservoirs or containers have a venting assembly mounted on an upper portion or an uppermost portion of the one or more water reservoirs. The corresponding venting assembly includes a vent port and a float valve operably associated therewith wherein the float valve is moveable between a first position in which the vent port is open and a second position in which the vent port is closed when the corresponding reservoir or container is filled. When the float valve moves from the first position to the second position, the pump amperage level is monitored to automatically deactivate or shut off pump when the float valve or valves have reached the second position indicating that the one or more water reservoirs or containers are filled to a predetermined level.

In a preferred form of the present invention, a cold water dispensing assembly is provided including one or more of the following: a liquid manifold, a cold water reservoir/container, a cold water dispensing nozzle, a pump head, an outlet port supplying water to a hot water reservoir/container and a venting assembly including a housing having a vent port and a float valve moveable in the housing to open and close the vent port wherein movement of the float valve from the open position to the closed position varies at least one condition of a liquid dispenser during filling or refilling of the cold water reservoir and/or the hot water reservoir wherein variances in the at least one condition can be monitored to enable hands free auto-filling (which includes auto-refilling) of the cold water reservoir and/or the hot water reservoir.

In a most preferred form, the cold water dispensing assembly including the liquid manifold, the cold water reservoir/container, the cold water dispensing nozzle, the outlet port supplying water to a hot water reservoir/container and the venting assembly including the vent port and the float valve are removable together, i.e., as a single unit or assembly. The cold water dispensing assembly can further include a pump removable with the other elements of the cold water dispensing assembly as a single unit or assembly.

A preferred form of the present invention is directed to a removable water dispensing assembly for a liquid dispenser for dispensing one or more consumable liquids. The removable water dispensing assembly includes a water manifold and a water reservoir operably connected to said water manifold to receive water from the water manifold. The removable water dispensing assembly further includes a float valve operably connected to the water reservoir and configured to indicate the level of water in the water reservoir, wherein the water manifold, the water reservoir and the float valve are removable as a single unit from the liquid dispenser.

A most preferred embodiment includes one or more baffles, ribs or flow directing portions/members/walls that prevent liquid entering the one or more water reservoirs or containers from inadvertently raising a float valve (i.e., when the float valve is moved upwardly not by the actual water level in the one or more water reservoirs or containers but by the liquid entering the one or more water reservoirs or containers) of a venting assembly operably associated with the one or more water reservoirs or containers.

A most preferred embodiment includes one or more baffles, ribs or flow directing portions/members/walls for directing water entering a cold water dispensing assembly to the outlet port of the cold water dispensing assembly connected to a hot water reservoir/container prior to entering the cold water reservoir/container of the cold water dispensing assembly so that the hot water reservoir/container is filled prior to the cold water reservoir/container.

BACKGROUND OF THE INVENTION

A drawback to existing liquid dispensers for dispensing a consumable beverage is the need for the customer to perform a hands on installation process. Specifically, known liquid dispensers require the customer to manually perform an initial filling process (i.e., hands on) to fill one or more reservoirs/containers (e.g., cold and/or hot water reservoirs/containers) of the liquid dispenser.

For example, upon purchasing and setting up a water cooler having hot and cold water reservoirs/containers connected to a source of water (e.g., five gallon water bottle stored in the bottom or other portion of a housing for a water cooler), the customer or other individual connects the water cooler to the source of water and plugs in the water cooler. The customer must then manually activate the water dispensing levers, buttons, etc. so that water from the five gallon water bottle or other water source is delivered to both the hot and cold water reservoirs. Once water comes out of both the hot and cold water dispensing nozzles of the water cooler, the customer knows that both the hot and cold water tanks/reservoirs are filled and the customer can release the water dispensing levers, buttons, etc.

Additionally, this hands on process must be repeated each and every time a cold water dispensing assembly is removed for cleaning and reinstalled or removed and replaced with a new cold water dispensing assembly.

Hence, there exists a need for a liquid dispenser having a hands free (i.e., no customer action after initialing plugging in the liquid dispenser and/or installing a new or sanitized removable water dispensing assembly) method and apparatus for automatically filling one or more reservoirs/containers of a liquid dispenser.

OBJECTS AND SUMMARY OF THE INVENTION

An object of the present invention is to provide a novel and unobvious apparatus and method for dispensing liquids including but not limited to cold water, ambient temperature water, hot water and/or a flavored beverage.

Another object of a preferred embodiment of the present invention is to provide a liquid dispenser that is relatively inexpensive to produce and is also easy to sanitize in a very short period of time.

A further object of a preferred embodiment of the present invention is to provide a liquid dispenser that automatically performs hands free auto-filling of one or more liquid reservoirs/containers of the liquid dispenser when initially plugged into an electrical outlet by a customer.

Yet a further object of a preferred embodiment of the present invention is to provide a liquid dispenser that automatically performs hands free auto-filling of one or more liquid reservoirs/containers of the liquid dispenser when a water dispensing assembly is removed, sanitized and reinstalled or removed and replaced with a new water dispensing assembly.

A further object of a preferred embodiment of the present invention is to provide a liquid dispenser configured to perform a hands free auto-filling of one or more liquid reservoirs/containers of the liquid dispenser at any point of operation of the liquid dispenser including but not limited to the initial installation of the liquid dispenser and/or removal of a water cartridge or manifold.

Yet another object of a preferred embodiment of the present invention is to provide a water dispensing assembly having a venting assembly including a vent port and a float valve the movement of which relative to the vent port causes at least one condition of a corresponding liquid dispenser to vary wherein the at least one condition of the liquid dispenser is automatically monitored by a control system to determine if the one or more reservoirs/containers of a liquid dispenser are filled to a predetermined level.

Still a further object of a preferred embodiment of the present invention is to provide a method which utilizes a venting assembly including a vent port and a float valve to determine if one or more reservoirs/containers of a liquid dispenser are filled.

Yet still another object of a preferred embodiment of the present invention is to provide a method and an apparatus that monitors changes in the pump amperage level of a pump supplying water to one or more reservoirs/containers of a liquid dispenser caused by movement of one or more float valves operably associated with the one or more reservoirs to determine if the one or more reservoirs/containers of a liquid dispenser are filled to a predetermined level.

Still yet a further object of a preferred embodiment of the present invention is to provide a cold water dispensing assembly including a liquid manifold, a cold water reservoir/container, a cold water dispensing nozzle, an outlet port supplying water to a hot water reservoir/container and a venting assembly including a housing having a vent port and a float valve moveable in the housing to open and close the vent port wherein movement of the float valve from the open position to the closed position varies at least one condition of a liquid dispenser during filling or refilling of the cold water reservoir and/or the hot water reservoir to enable hands free auto-filling (which includes auto-refilling) of the cold water reservoir and/or the hot water reservoir.

Another object of a preferred embodiment of the present invention is to provide a cold water dispensing assembly including a liquid manifold, a cold water reservoir, a vent assembly including a float valve the position of which indicates if the one or more reservoirs/containers of a liquid dispenser need to be filled wherein all of the aforementioned components of the cold water dispensing assembly are removable as a single unit or assembly from a liquid dispenser (e.g., water cooler).

A further object of a preferred embodiment of the present invention is to provide a water dispensing assembly that is removable from a liquid dispenser for dispensing one or more consumable liquids as a single unit or assembly wherein the water dispensing assembly includes a water manifold, a water reservoir operably connected to the water manifold to receive water from the water manifold and a float valve operably connected to the water reservoir and configured to indicate the level of water in the water reservoir.

Still a further object of a preferred embodiment of the present invention is to provide one or more baffles, ribs or wall portions for preventing water entering a cold water reservoir/container from inadvertently raising a float valve of a preferred venting assembly to a position which is not indicative of the actual water level of the cold water reservoir/container.

Yet still a further object of a preferred embodiment of the present invention is to provide one or more baffles, ribs or wall portions that direct water entering a water manifold or cartridge to the hot water outlet port of the water manifold or cartridge so that a hot water reservoir/container is filled prior to filling of a cold water reservoir/container.

It must be understood that no one embodiment of the present invention need to include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to a water dispensing assembly for a liquid dispenser for dispensing one or more consumable liquids. The water dispensing assembly includes a water manifold including a water inlet port, a first water reservoir, a first water outlet port and a second water outlet port. The water inlet port is configured to receive water from a water source operably connected to the water manifold when the water manifold is installed in an operating position. The water manifold is configured to direct water entering the water inlet port to the first water reservoir and the second water outlet port. The first water outlet port is connected to the first water reservoir to receive water from the first water reservoir. The water dispensing assembly further includes a first venting assembly including a float valve and a housing for housing the float valve. The housing further includes a vent port. The housing of the first venting assembly is fluidly connected to the first water reservoir such that during filling of the first water reservoir the float valve moves between a first position in which the vent port is open and a second position in which the float valve closes the vent port when the first water reservoir is filled with water to a predetermined level.

Another preferred embodiment of the present invention is directed to a method of hands free auto-filling of one or more water reservoirs of a liquid dispenser for dispensing one or more consumable liquids. The method includes the steps of: (a) providing a liquid dispenser for dispensing one or more consumable liquids, the liquid dispenser having a water dispensing assembly including a water inlet port, a first water reservoir and a first water outlet port, the water inlet port is configured to receive water from a water source operably connected to the water dispensing assembly, the water dispensing assembly is configured to direct water entering the water inlet port to the first water reservoir, the first water outlet port is connected to the first water reservoir to receive water from the first water reservoir, the liquid dispenser further including a first venting assembly including a float valve and a housing for housing the float valve, the housing of the first venting assembly further including a vent port, the housing of the first venting assembly is fluidly connected to the first water reservoir such that during filling of the first water reservoir the float valve moves between a first position in which the vent port is open and a second position in which the float valve closes the vent port when the first water reservoir is filled with water to a predetermined level; (b) automatically directing water from the water source to the water manifold so that water passes through the water inlet port and enters the first water reservoir to fill or refill the first water reservoir; (c) while water is being directed into the first water reservoir, monitoring at least one condition of the liquid dispenser that changes as the float valve moves between the first position and the second position as a water level in the first water reservoirs changes; and, (d) automatically discontinuing water flow to the first water reservoir when the at least one condition being monitored indicates that the float valve reaches the second position closing the vent port.

A further preferred embodiment of the present invention is directed to a liquid dispenser for dispensing at least two different consumable liquids. The liquid dispenser includes a liquid dispenser housing for housing a water manifold including a water inlet port, a first water reservoir, a first water outlet port and a second water outlet port. The water inlet port is configured to receive water from a water source operably connected to the water manifold. The water manifold is configured to direct water entering the water inlet port to the first water reservoir and the second water outlet port. The first water outlet port is connected to the first water reservoir to receive water from the first water reservoir to dispense a first consumable liquid from the liquid dispenser. The liquid dispenser further includes a first venting assembly including a float valve and a housing for housing the float valve. The housing of the first venting assembly further includes a vent port. The housing of the first venting assembly is fluidly connected to the first water reservoir such that during filling of the first water reservoir the float valve moves between a first position in which the vent port is open and a second position in which the float valve closes the vent port when the first water reservoir is filled with water to a predetermined level. The second water outlet port is connected to a second water reservoir to supply water to the second water reservoir. A second venting assembly includes a float valve and a housing for housing the float valve. The housing of the second venting assembly further includes a vent port. The housing of the second venting assembly is fluidly connected to the second water reservoir such that during filling of the second water reservoir the float valve moves between a first position in which the vent port is open and a second position in which the float valve closes the vent port when the second water reservoir is filled with water to a predetermined level. A control system of the liquid dispenser for monitoring at least one condition of the liquid dispenser that varies with movement of the float valve of one of the first venting assembly and the second venting assembly to shut off the flow of water to the water manifold when the float valve of one of the first venting assembly and the second venting assembly is in the second position.

Still another preferred embodiment of the present invention is directed to a removable water dispensing assembly for a liquid dispenser for dispensing one or more consumable liquids. The removable water dispensing assembly includes a water manifold and a water reservoir operably connected to the water manifold to receive water from the water manifold. The removable water dispensing assembly further includes a float valve operably connected to the water reservoir and configured to indicate the level of water in said water reservoir, wherein the water manifold, the water reservoir and the float valve are removable as a single unit from the liquid dispenser.

The above summary describes preferred forms of the present invention and is not in any way to be construed as limiting the claimed invention to the preferred forms.

DETAILED DESCRIPTION OF THE PREFERRED EMBODIMENT OF THE INVENTION

The preferred forms of the invention will now be described with reference to FIGS. 3-15. The appended claims are not limited to the preferred forms and no term and/or phrase used herein is to be given a meaning other than its ordinary meaning unless it is expressly stated otherwise.

Figure 1:
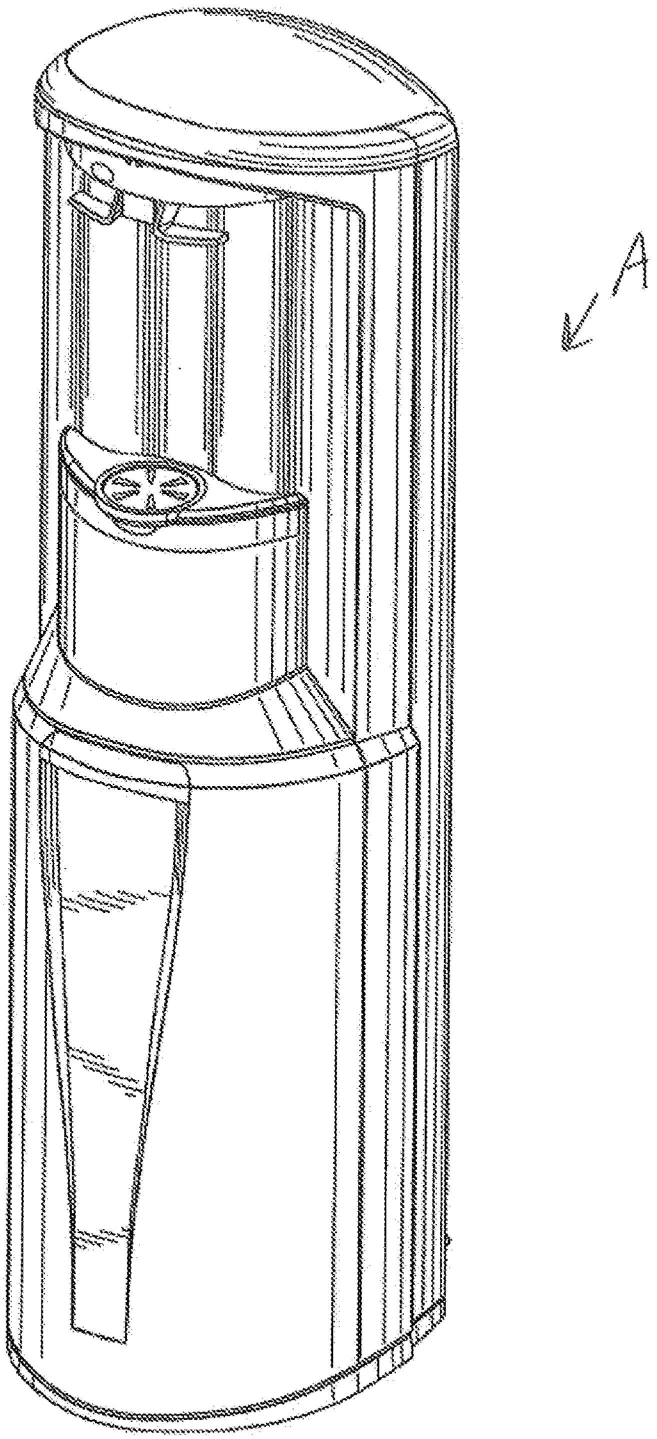
FIG. 1 is a perspective view of one example of one of numerous possible or suitable housings of a liquid dispenser having one or more of the inventive features set forth herein.
Figure 2:
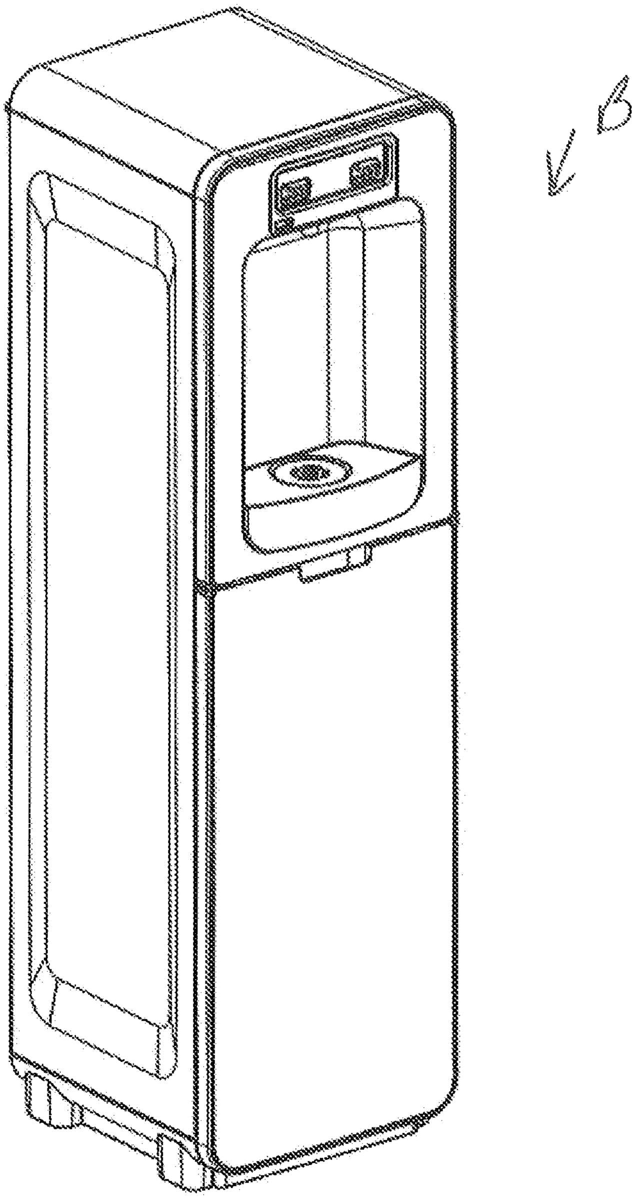
FIG. 2 is a perspective view of another example of a housing of a liquid dispenser having one or more of the inventive features set forth herein.

FIGS. 1 and 2 depict known dispenser housings A and B, respectively, of liquid dispensers in which one or more inventive features can be stored or housed. Each of the housings A and B of FIGS. 1 and 2, respectively, preferably include a removable lower portion for storing a water bottle (e.g., five gallon water bottle) that is the source of water for the liquid dispenser. However, the present invention is not limited to a bottom loaded dispenser (i.e., a water cooler or liquid dispenser in which the water bottle is loaded in a lower portion of the liquid dispenser) and further the present invention is not limited to a liquid dispenser having a water bottle as the source of water. Rather, the source of water could be a water bottle mounted to an upper portion of the liquid dispenser (i.e., top loaded liquid dispenser or water cooler) or the source of water could be supplied by the plumbing of a building in which the liquid dispenser is disposed and connected to.

Figure 3:
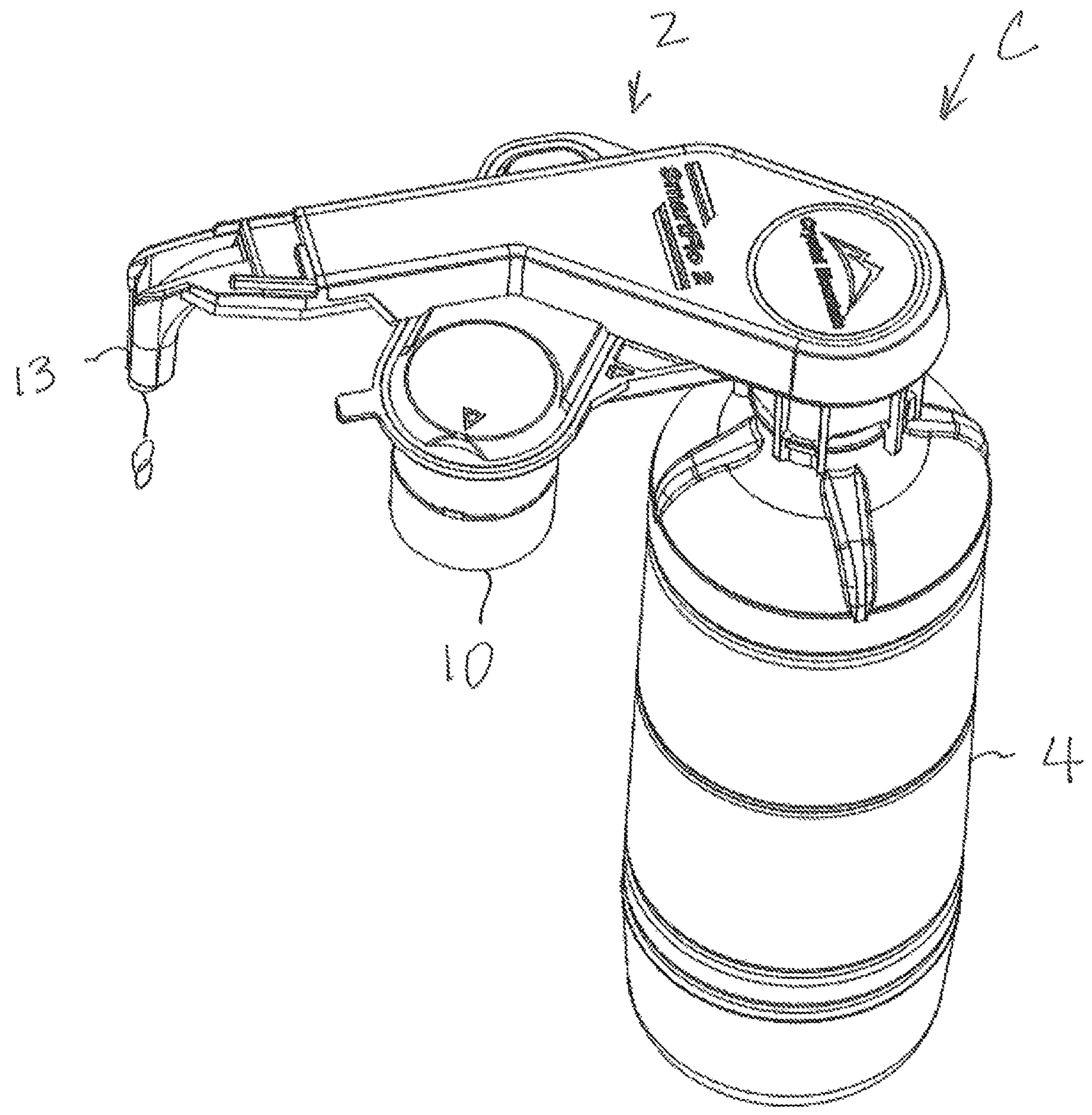
FIG. 3 is a perspective view of a preferred water dispensing assembly of the present invention which is removable as single unit or assembly from a corresponding liquid dispenser in which the water dispensing assembly is installed.
Figure 4:
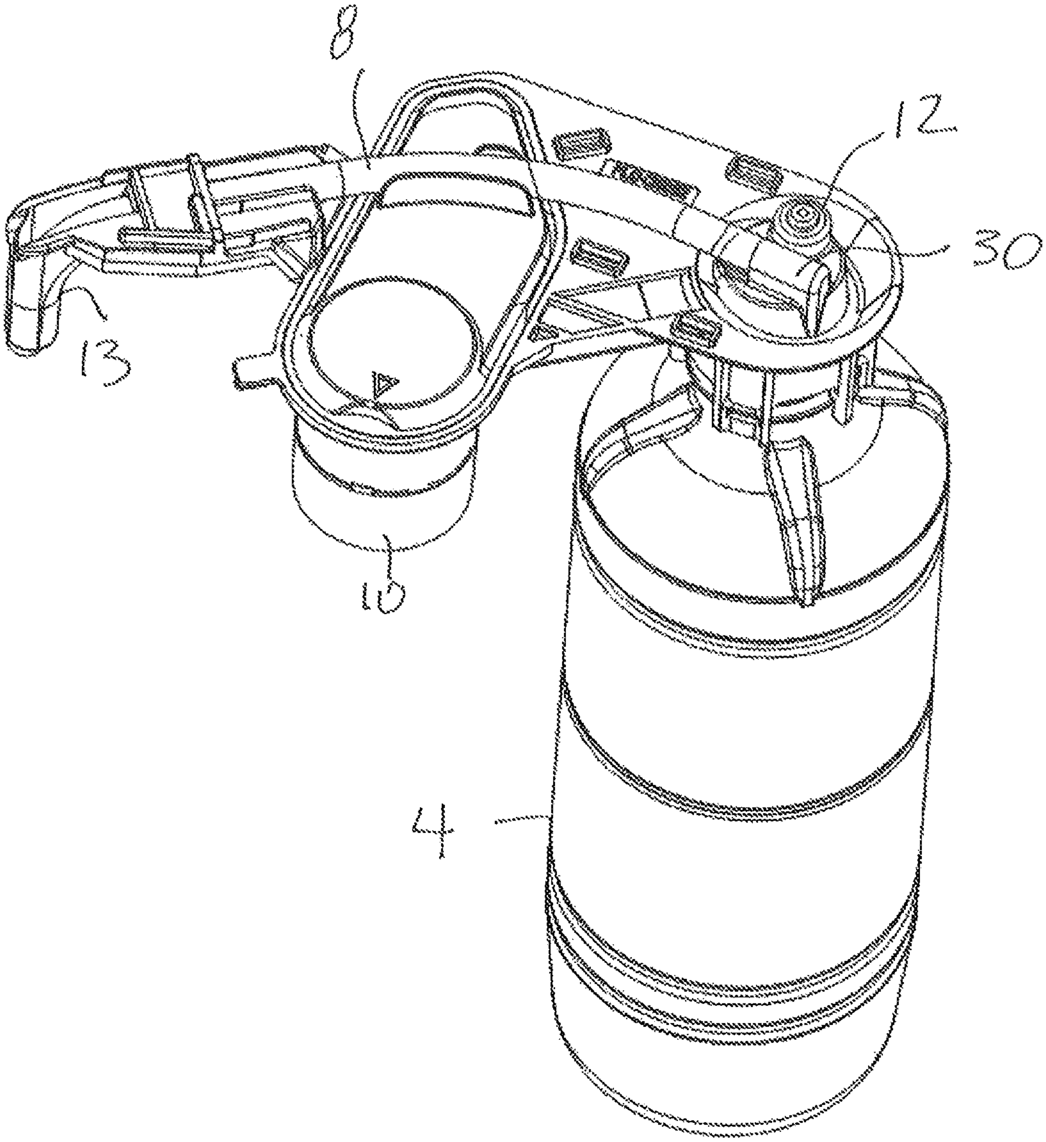
FIG. 4 is a perspective view of a preferred water dispensing assembly depicted in FIG. 3 with an uppermost element/cover removed to reveal various components below the uppermost element/cover.
Figure 5:
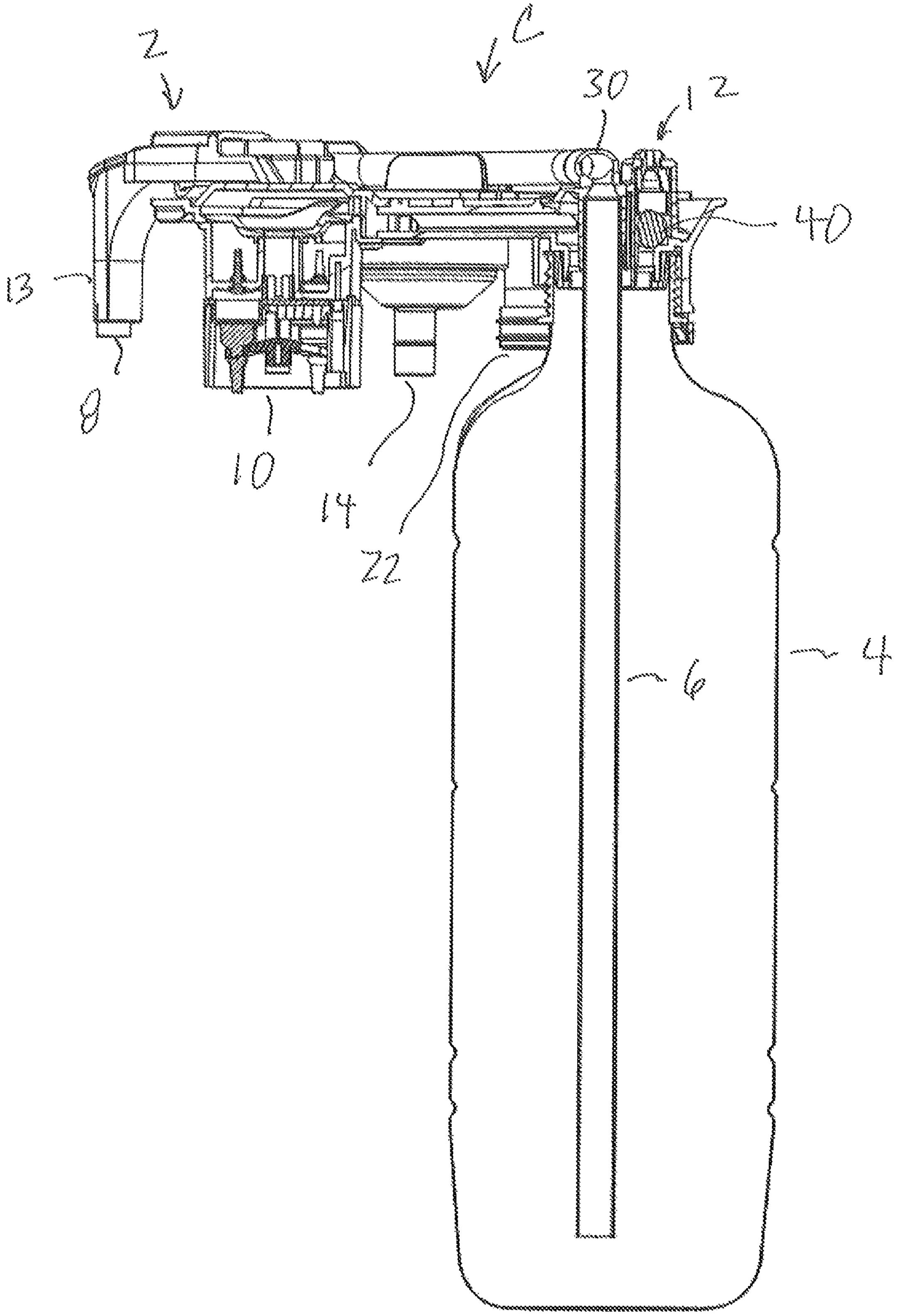
FIG. 5 is a cross-sectional view of the preferred water dispensing assembly depicted in FIG. 3 with a float valve of the preferred water dispensing assembly in a lowermost position in which a vent port is open.

Preferred forms of water dispensing assembly C shown in, for example, FIG. 3 of the present invention are removable from the housing of the liquid dispenser. In this regard, housings A and B preferably include a cover moveable between a closed position shown in FIGS. 1 and 2 and an open position allowing an individual to readily access and remove the preferred water dispensing assembly C. U.S. Pat. Nos. 8,887,955 and 9,527,714, the entire contents of which are incorporated herein by reference, describe water dispensing assemblies removable from a housing of a liquid dispenser similar to or the same design/configuration as housing A.

The preferred removable water dispensing assembly C (described in greater detail below) can be removably mounted in the housings A and/or B in the same or similar manner described in U.S. Pat. Nos. 8,887,955 and 9,527,714. In fact, a preferred removable water dispensing assembly C can be readily installed in the well-known and popular STORM® water cooler with little or no modifications to the internal components of the STORM® water cooler to which the removable water dispensing assembly C are connected. In this regard, it is noted that the control system including, for example, the printed circuit board (PCB) of the STORM® water cooler would need to be modified to perform the hands free auto-filling process of the present invention.

The present invention is not limited to a removable water dispensing assembly C. Rather, water dispensing assembly C can be configured such that it cannot be removed from the housing of the corresponding liquid dispenser.

The consumable liquids dispensed by the liquid dispenser of the present invention could take any form including but not limited to those discussed in U.S. Pat. Nos. 8,887,955; 9,527,714; and 10,781,093.

FIGS. 3 Through 11

Referring to FIGS. 3 to 11, a preferred water dispensing assembly C employing a preferred form of the invention is illustrated in one of many possible configurations. Preferably, the water dispensing assembly C is configured such that all components of the water dispensing assembly C depicted in FIG. 3 are removable from the housing (e.g., housings A and B) of a corresponding liquid dispenser as single unit or assembly. In a preferred form, all components of the water dispensing assembly C depicted in FIG. 3 are readily removable from the corresponding housing by raising or removing the cover of the corresponding housing to allow an individual to manipulate any locking or latching members securing the water dispensing assembly C in the housing to free the water dispensing assembly C so that the water dispensing assembly C can be readily removed in the same or similar manner as depicted and described in U.S. Pat. Nos. 8,887,955 and 9,527,714. Notably, when the water dispensing assembly C is raised to a point that exposes the connection of the water dispensing assembly C to a conduit connected to the water source, the water source connection conduit will typically need to be disconnected from the water dispensing assembly C to permit removal. However, the connection of the water source connection conduit to the water dispensing assembly C could include one or more connectors that allow for detachment of the water dispensing assembly C merely by raising upwardly the water dispensing assembly C with a predetermined force.

In a most preferred form, water dispensing assembly C includes a water manifold 2, a water reservoir 4, a hollow dip tube 6, a water dispensing nozzle or member 8, a pump head 10 and a venting assembly 12 (see, for example, FIGS. 3 to 5, 7, 9 and 11). However, water dispensing assembly C can be formed without one or more of the components described above including but not limited to pump head 10. Water manifold 2 is preferably formed from a rigid or substantially rigid material to facilitate removal of water dispensing assembly C.

Water manifold 2 preferably includes a guide member 13 that directs a terminal dispensing end of member 8 downwardly to dispense water to a cup or other container disposed below the terminal dispensing end of member 8. A lever or other dispensing activation member is operably connected to conduit 8 to allow dispensing of water from water reservoir through member 8 when activated.

Figure 12:
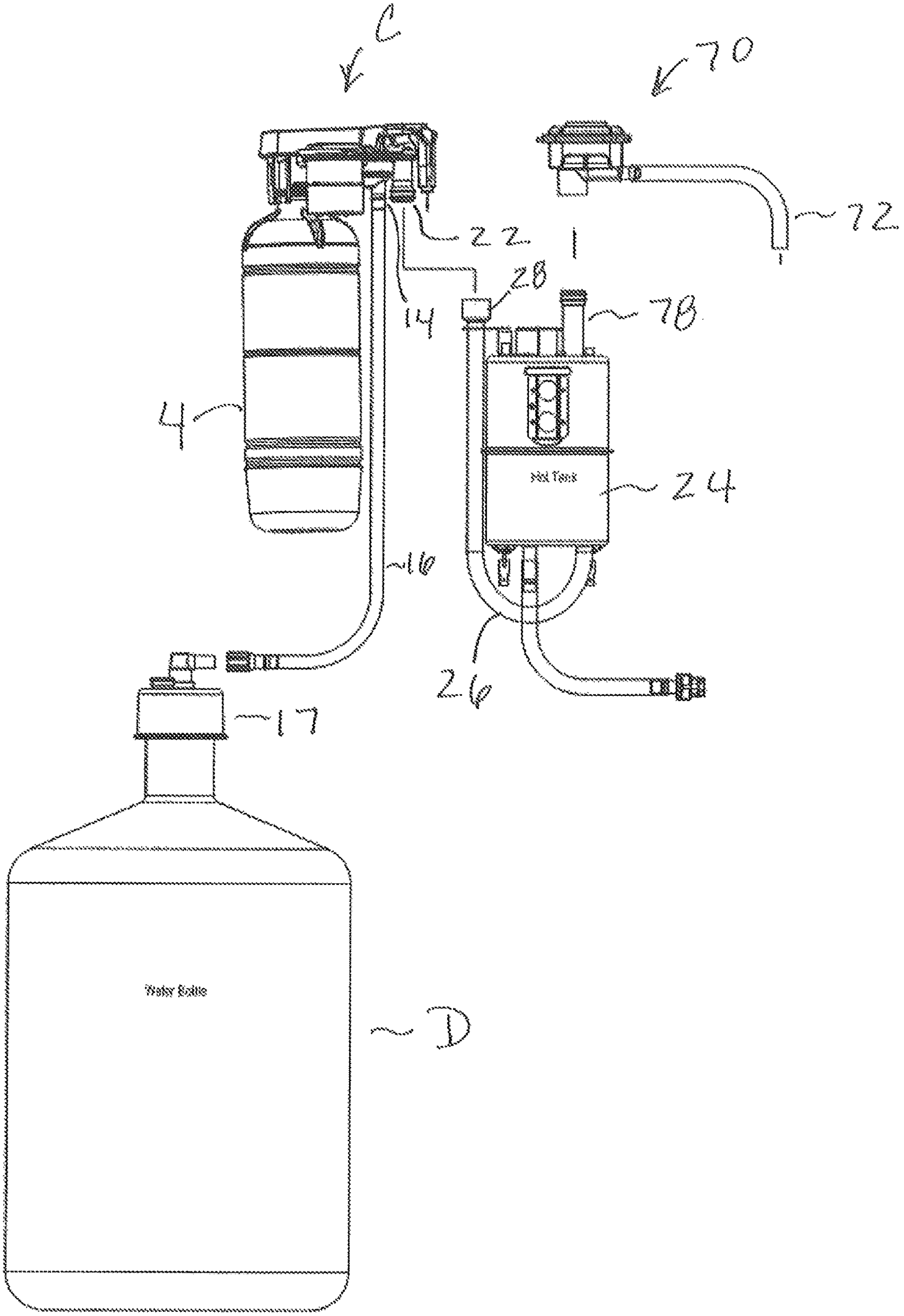
FIG. 12 is an elevational view of a preferred embodiment schematically showing the connection of a water bottle to be installed in a lower portion of the housing of the liquid dispenser to a preferred removeable water dispensing assembly and the connection of the preferred removable water dispensing assembly to the hot water reservoir and the hot water reservoir venting assembly.

Water manifold 2 includes a water inlet port 14 (see, for example, FIG. 5) connected to a source of water by one or more water conduits and/or connectors operably connected to port 14. Where the liquid dispenser is a bottom loaded liquid dispenser, water inlet 14 is preferably connected to water bottle D (e.g., five gallon water bottle) by water conduit 16 and a puncture cap adapter 17 seated on the throat of water bottle D as schematically shown in FIG. 12. The puncture cap adapter 17 can be of the type disclosed in U.S. Pat. No. 9,527,639. Opposing ends of water conduit 16 can include a quick disconnect connector or any other suitable connector to connect conduit 16 at one end to water inlet port 14 and at the other end to bottle D with or without puncture cap adapter 17. Any other suitable connecting devices or conduits can be used provided that water conveyed from bottle D to water manifold 2 does not leak into the dispenser housing.

Figure 11:
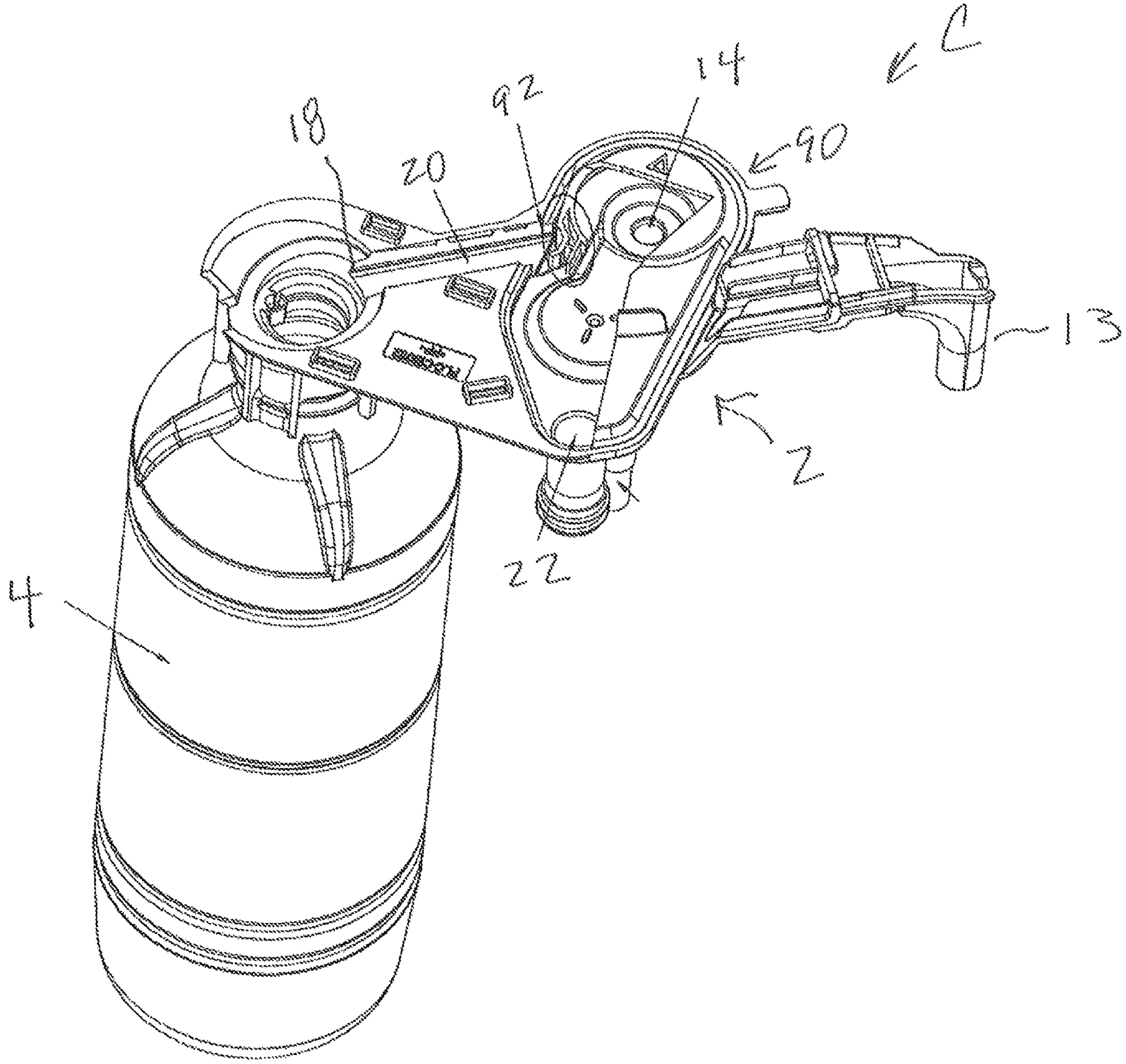
FIG. 11 is a perspective view of the removable water dispensing assembly depicted in FIG. 3 with portions thereof removed so that internal components configured to direct flow of water through the removable water dispensing assembly that ensure that a hot water reservoir of a preferred embodiment is filled prior to filling of a cold water reservoir.

Water manifold 2 includes a water outlet port 18 at a terminal end of water channel 20 of water manifold 2 to supply water entering water manifold 2 through water inlet 14 to the water reservoir 4 via channel 20 and port 18 as shown in, for example, FIG. 11. Water manifold 2 further includes water outlet port 22 connected to water tank or reservoir 24 by one or more conduits 26 as shown in FIG. 12. The uppermost portion of conduit 26 can be provided with a hollow annular collar 28 that water outlet port 22 can be seated in to form a fluid tight connection between port 22 and collar 28. It is to be noted that the outlet port 22 can be connected in any other suitable manner to reservoir 24.

Water manifold 2 further includes an upper section or portion 30 connected in a fluid tight manner to an upper end of dip tube 6. Upper section 30, in turn, is connected in a fluid tight manner to dispensing member 8 to supply water from reservoir 4 to dispensing member 8.

Preferably, reservoir or container 4 is detachably connected to water manifold 2 in a fluid tight manner to receive water from water manifold 2 by way of channel 20. Water manifold 2 can include an annular collar 32 configured to receive a ribbed or threaded upper portion 34 of reservoir 4 to provide a fluid tight detachable connection between reservoir 4 and manifold 2 as shown in, for example, FIG. 8.

Venting assembly 12 preferably includes a float valve 40 and a sealing gasket 42 disposed in a portion of water manifold 2. Preferably, float valve 40 is afloat ball. The float valve 40 and/or the sealing gasket 42 can be formed from polypropylene or any other suitable material. One such suitable material is PPH-TO3 (model number) sold by Sinopec Maoming Company. Sealing gasket 42 includes an internal vent channel 44 extending through the sealing gasket 42 configured to allow air to escape through vent channel 44 of sealing gasket 42 when venting assembly 12 is open.

Figure 6:
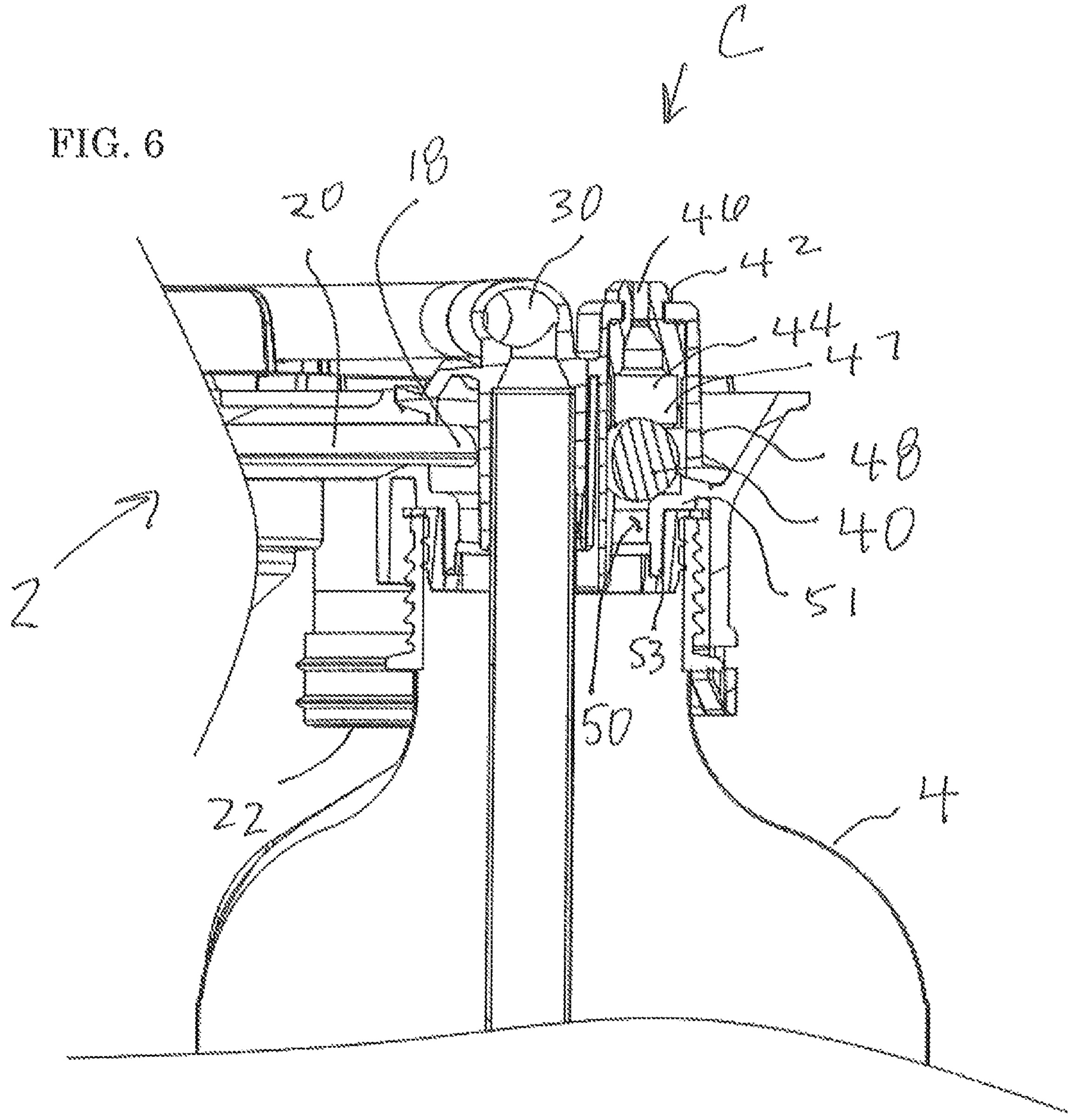
FIG. 6 is an enlarged view of a right, upper portion of FIG. 5.
Figure 7:
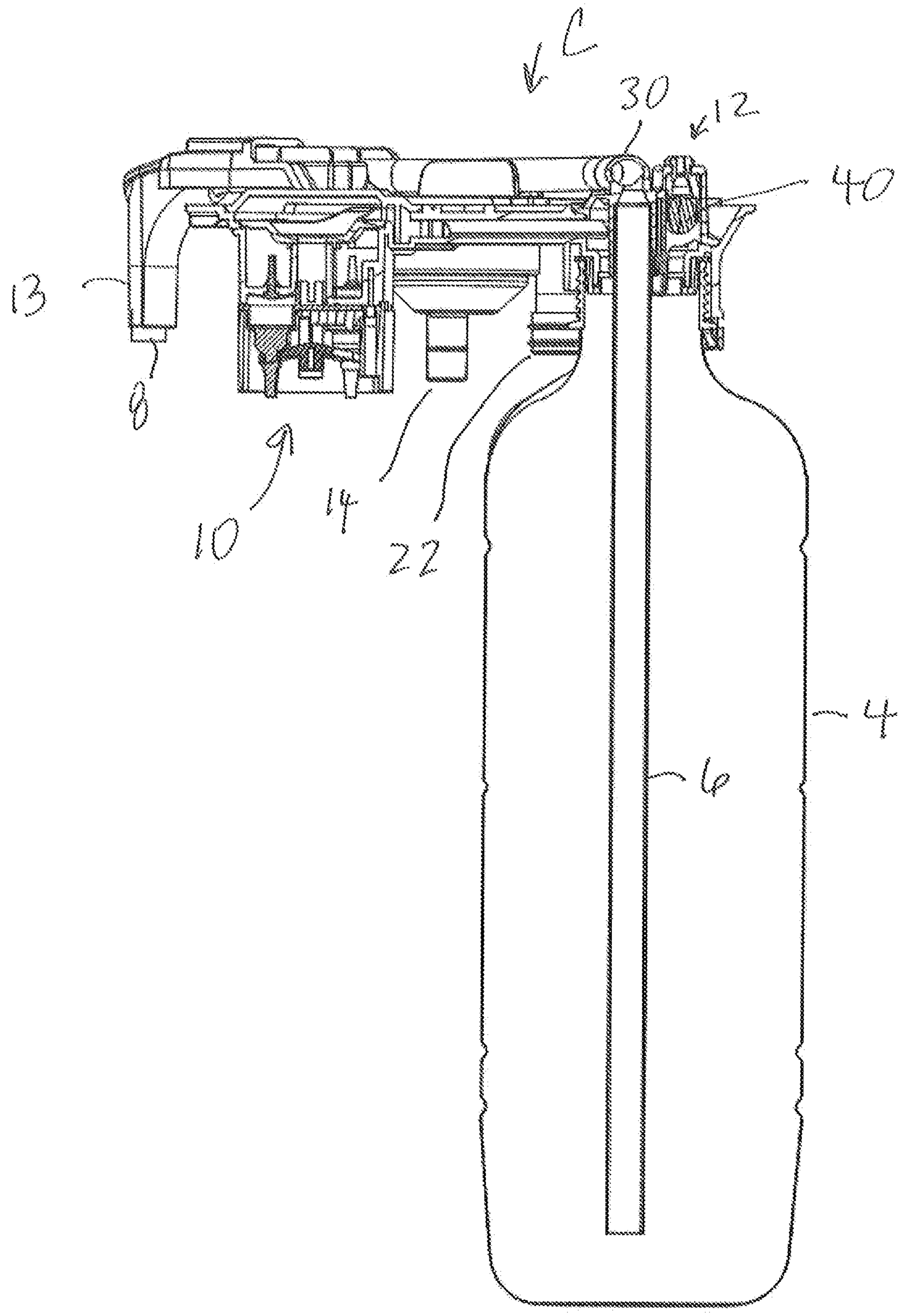
FIG. 7 is a cross-sectional view of the preferred water dispensing assembly depicted in FIG. 3 with a float valve of the preferred water dispensing assembly in an uppermost position in which a vent port is closed or sealed.

The upper end of vent channel 44 includes a vent port 46. A lower portion of vent channel 44 includes a hollow annular collar 47 configured to receive float ball 40 to seal vent channel 44 to prevent the escape of air through the venting assembly 12 when the venting assembly is closed. As seen in, for example FIGS. 6, 8 and 10, venting assembly 12 includes a housing 48 that houses sealing gasket 42 and float valve 40. Housing 48 includes a retaining member for limiting downward movement of float valve 40 to the position depicted in, for example, FIG. 6 (i.e., FIG. 6 depicts a lowermost position of valve 40).

In a preferred embodiment, housing 48 is provided with a retaining member 50 that prevents valve 40 from moving downwardly below the position shown in FIG. 6 but allows water from reservoir 4 to pass upwardly into housing 48 so that water can raise float valve 40 to the position shown in FIG. 8 during filling of reservoir 4. Preferably, retaining member 50 includes an inwardly extending annular wall portion 51 and downwardly extending annular wall portion 53.

Figure 8:
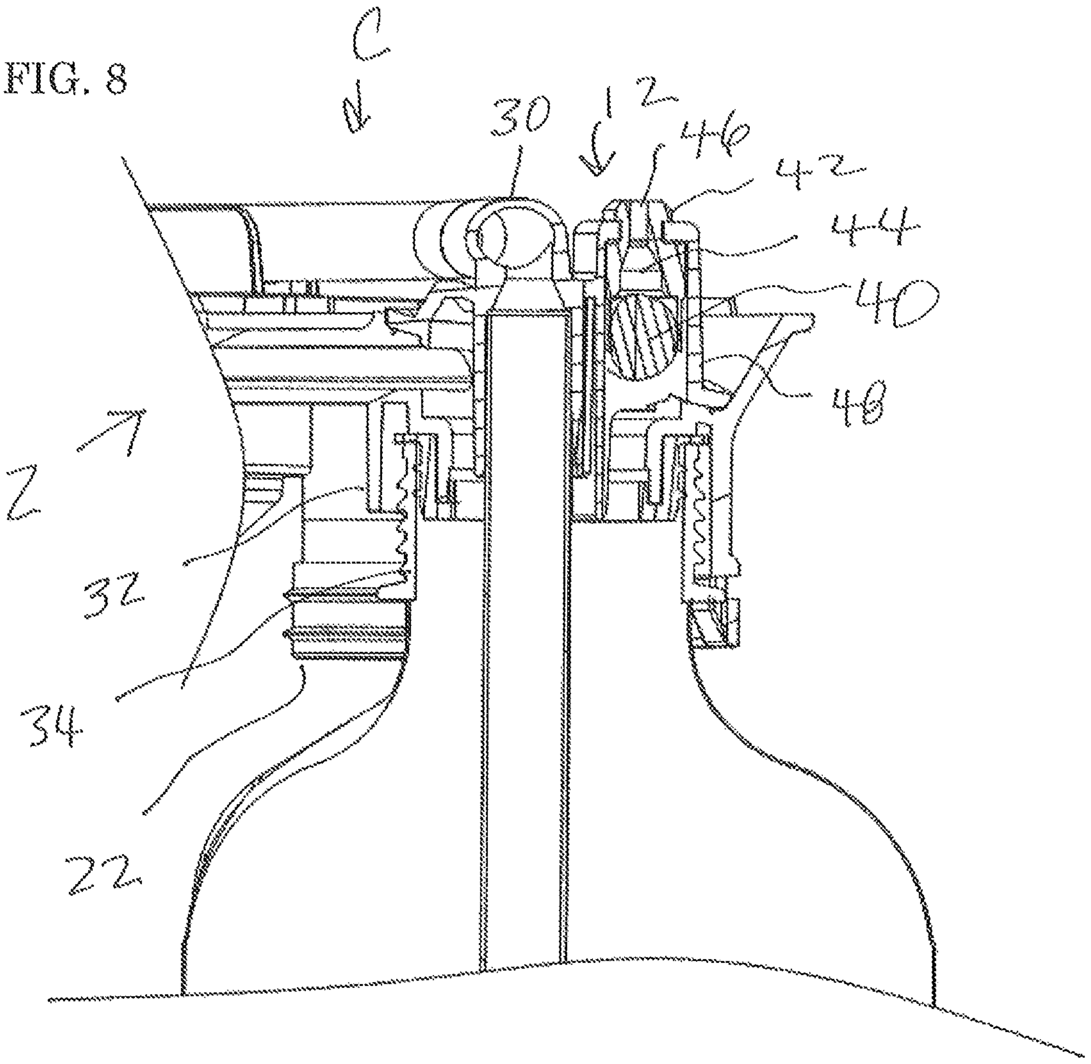
FIG. 8 is an enlarged view of a right, upper portion of FIG. 7.
Figure 9:
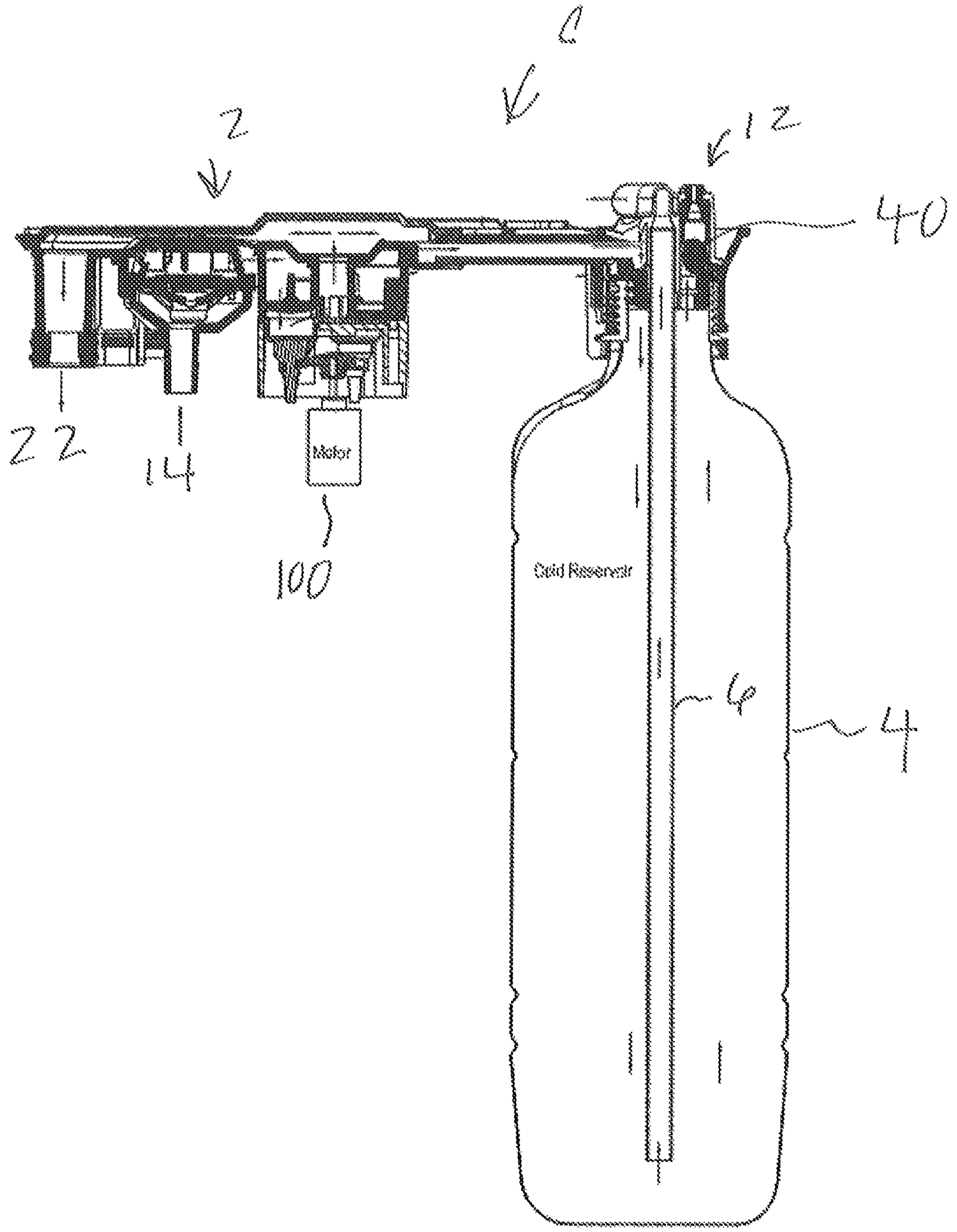
FIG. 9 is a cross-sectional view of the preferred water dispensing assembly depicted in FIG. 3 with a motor of a pump connected to a pump head.

In the position shown in FIG. 8, float valve 40 seals vent channel 44 when reservoir 4 is completely filled preventing air from escaping through venting assembly 12. Specifically, float valve 40 is moved upwardly to the sealing position by water in reservoir 4 impacting float valve 40.

Housing 48 can be formed from a portion of water manifold 2 or could be a separate piece detachably or permanently connected to a corresponding portion of water manifold 2.

Figure 10:
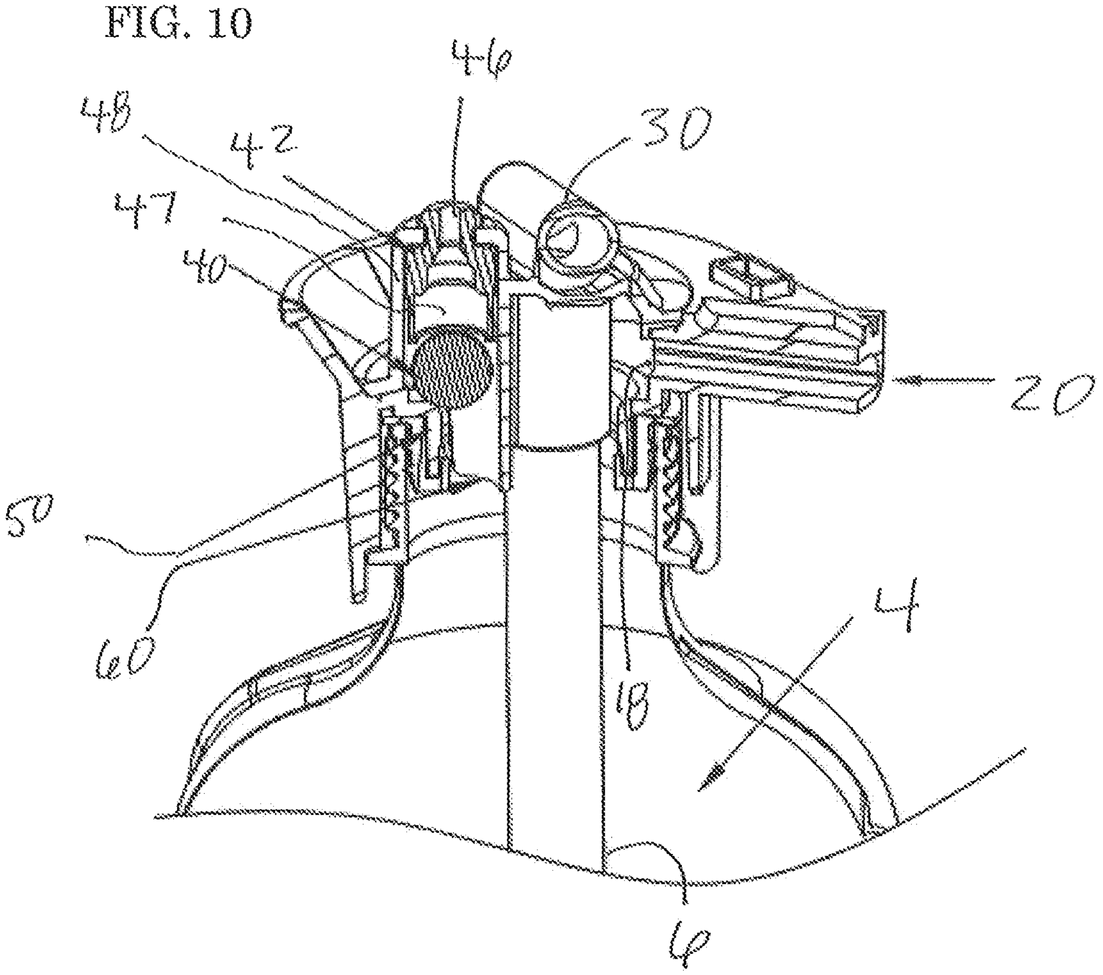
FIG. 10 is an enlarged cross-sectional view of a portion of the removable water dispensing assembly depicted in FIG. 3.

Referring to FIG. 10, one or more baffles, ribs, lips or wall portions are provided to prevent water flowing from water channel 20 of water manifold 2 into reservoir 4 from inadvertently raising valve 40 to a position that is not indicative of the actual level of water in reservoir 4. Preferably, wall portion or baffle 60 is disposed on a side of dip tube 6 furthest from water inlet channel 20 in a position to completely shield float valve 40 from water entering reservoir 4 through channel 20 thereby preventing float ball 40 from being inadvertently raised. Wall or baffle 60 preferably extends above an uppermost portion of valve 40 when valve 40 is in a closed position depicted in, for example, FIG. 8. Also, wall or baffle 60 preferably extends below a lowermost portion of valve 40 when valve 40 is in an open position depicted in, for example, FIG. 6. Preferably, the side of wall 60 facing valve 40 has a shape complimentary (e.g., arcuate) to the shape of float ball 40 so that wall 60 does not restrict vertical movement of float ball 40 caused by the rising water level in reservoir 4 during a filling process. The width of wall 60 is preferably equal to or exceeds the diameter of float ball 40 to completely shield valve 40 from the flow of water entering reservoir 4.

Retaining member 50 having inwardly extending annular wall portion 51 and downwardly extending annular wall portion 53 can also prevent water flowing from channel 20 from inadvertently raising float valve 40.

Preferably, water reservoir 4 is a cold water reservoir. In this regard, water reservoir 4 can be seated into a chilling element in the corresponding housing of the liquid dispenser when the water dispensing assembly C is inserted in the housing of the liquid dispenser in an operating position.

Water reservoir 24 is preferably a hot water reservoir. Any suitable heating element can be operably connected to reservoir 24 to heat water in or flowing into or from reservoir 24.

Figure 13:
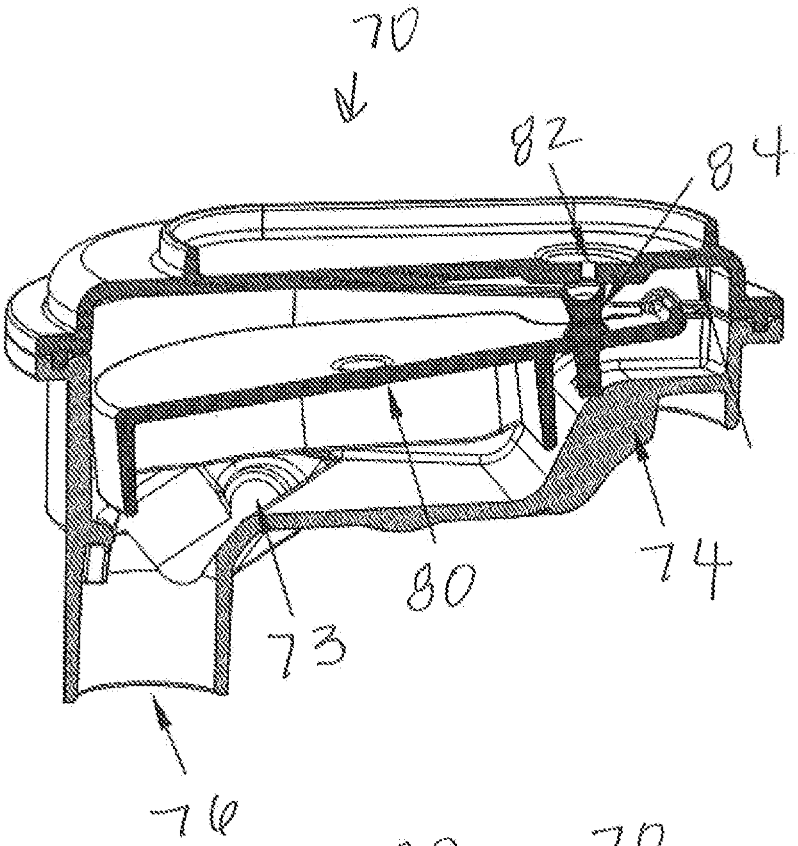
FIG. 13 is a sectional view of a preferred hot water reservoir venting assembly with the float valve in a lowermost position wherein the vent port of the hot water reservoir venting assembly is open and in an air venting condition.
Figure 14:
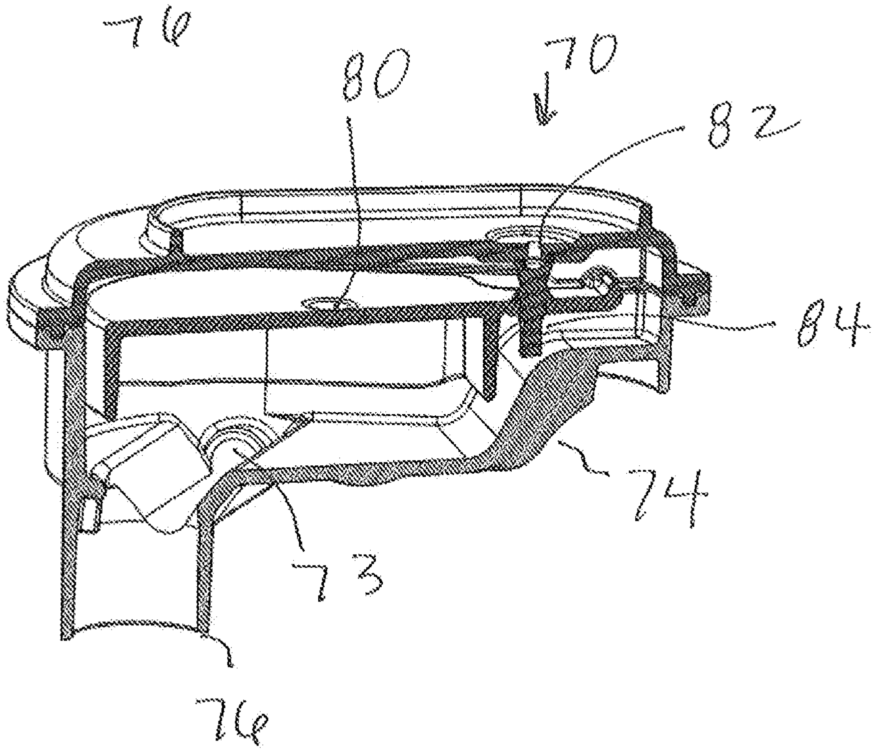
FIG. 14 is a sectional view of the preferred hot water reservoir venting assembly with the float valve in an uppermost position wherein the vent port of the hot water reservoir venting assembly is closed or sealed preventing venting.

Referring to FIGS. 12 to 14, a venting assembly 70 is mounted on hot water tank or reservoir 24. A hot water dispensing conduit or nozzle 72 is operably connected via outlet port 73 to venting assembly 70 and hot water reservoir 24 to dispense hot water from the liquid dispenser. A lever or other dispensing activation member is operably connected to conduit 72 to allow dispensing of hot water from water reservoir 24 through member 72. It should be noted that the hot water reservoir 24 could be connected to a flavored beverage dispensing assembly to dispense hot water and/or a hot flavored beverage as described in U.S. Pat. No. 10,781,093.

Venting assembly 70 includes a housing 74 having an annular and hollow inlet port 76 that receives or is operably connected in a fluid tight manner to outlet port 78 of hot water reservoir 24. A float valve 80 is pivotally mounted in housing 74 to move between a closed position shown in FIG. 14 and an open position shown in FIG. 13. Housing 74 includes a vent port 82 that is sealed by sealing member 84 of float valve 80 when float valve 80 is in the position shown in FIG. 14 wherein the sealing element 84 surrounds and seals vent port 82. When the liquid dispenser is operating in a mode other than initial filling and/or refilling of the reservoirs 4 and 24, float valve 80 is in the open position shown in FIG. 13 to allow any steam to be vented through venting assembly 70.

Referring to FIG. 11, main body section 90 of water manifold 2 preferably includes one or more flow directing baffles, walls or members that direct the flow of water entering water inlet port 14 from the water source to water outlet port 22 of manifold 2 so that reservoir 24 is filled during a filling process prior to reservoir 4. In a preferred embodiment, a vertically extending wall or baffle 92 surrounds at least a portion of the water entry side of channel 20 closest to inlet port 14 so that water entering main body section 90 flows first into reservoir 24 to fill reservoir 24 and upon filling of water reservoir 24 water in the main body section 90 is directed into water reservoir 4 through channel 20. It should be noted that during the process of filling reservoir 24 some water may pass into reservoir 4 before reservoir 24 is completely filled.

During a filling or refilling process, once reservoir 24 is completely filled, float valve 80 will be moved upwardly by the water in reservoir 24 to seal vent port 82. Once reservoirs 4 and 24 are filled and the filling or refilling process is discontinued, float valve 80 will move downwardly due to a drop in pressure in the fluid system to the open position shown in FIG. 13.

The process of hands free auto-filling of reservoirs 4 and 24 will now be described. The control system of the liquid dispenser preferably includes a microprocessor, a computer program executed by the microprocessor and a printed circuit board (PCB). The control system is configured such that after the customer or user initial sets up the liquid dispenser after purchase including connecting the source of water to water manifold 2 and plugging in the liquid dispenser, water is automatically directed from the water source to water manifold 2 to start the hands free auto-filling process. Preferably, water manifold 2 first directs water into reservoir 24 so that reservoir 24 is filled before reservoir 4. Upon filling of reservoir 24, float valve 80 will move to the closed position shown in FIG. 14. Water manifold 2 then directs water into reservoir 4 to fill the same. Float valve 40 moves from the position shown in FIG. 6 to the position shown in FIG. 8 when reservoir 4 is filled.

As float valve 40 moves from the position shown in FIG. 6 to the position in FIG. 8, at least one condition of the liquid dispenser changes or varies. In a most preferred form, the at least one condition of the liquid dispenser that changes or varies is amperage level of a pump configured to pump water from water bottle D to water manifold 2. Specifically, the amperage level of pump motor 100 (see FIG. 9) connected to pump head 10 will increase as float valve 40 moves to the closed position shown in FIG. 8 as air is not allowed to escape from water dispensing assembly C once valve 40 is in the position shown in FIG. 8.

The control system automatically shuts off or deactivates pump 100 to automatically discontinue the flow of water to water manifold 2 when the amperage level of pump 100 reaches or exceeds a predetermined level indicating valve 40 has moved to the position shown in FIG. 8 indicating that reservoir 4 has been filled. During the filling process just described, the customer or user no longer needs to manually hold the hot and/or cold water dispensing levers, buttons, etc. in a dispensing position during the process of filling or refilling the reservoirs of the liquid dispenser. In fact, the customer or user need not touch the liquid dispenser during the hands free auto-filling process of the reservoirs of the liquid dispenser.

The above hands free auto-filling process can also be performed upon removal and installation of a sanitized water dispensing assembly C or removal and replacement of the water dispensing assembly C with anew water dispensing assembly. Similarly, the control system can be configured to activate the hands free auto-filling process at any point including when the level of water in reservoirs 4 and 24 has fallen below a predetermined level.

While venting assemblies 12 and 70 preferably are configured such that the corresponding float valves do not move into a closed position until the corresponding reservoir is completely filled, the venting assemblies including the corresponding float valves can be configured such that they move to a closed position upon a partial or substantial filling of the corresponding reservoirs.

In top loaded liquid dispensers and liquid dispensers connected to the plumbing of a building in which the liquid dispenser is located, a pump is typically not used. A pressure sensor or other suitable sensor including but not limited to a positional sensor could be used to detect or sense when the float valve of either or both of venting assembly 12 and venting assembly 70 moves to a closed position to discontinue the flow of water to manifold 2 when reservoirs 2 and 24 are filled to a predetermined level.

While the above hands free auto-filling process of reservoirs 4 and 24 fills reservoir 24 first, reservoir 4 could be filled first or alternatively reservoirs 4 and 24 could be filled simultaneously or substantially simultaneously. Further, the hands free auto-filling process described above is applicable to a liquid dispenser having a single reservoir receiving water from a water source.

Figure 15:
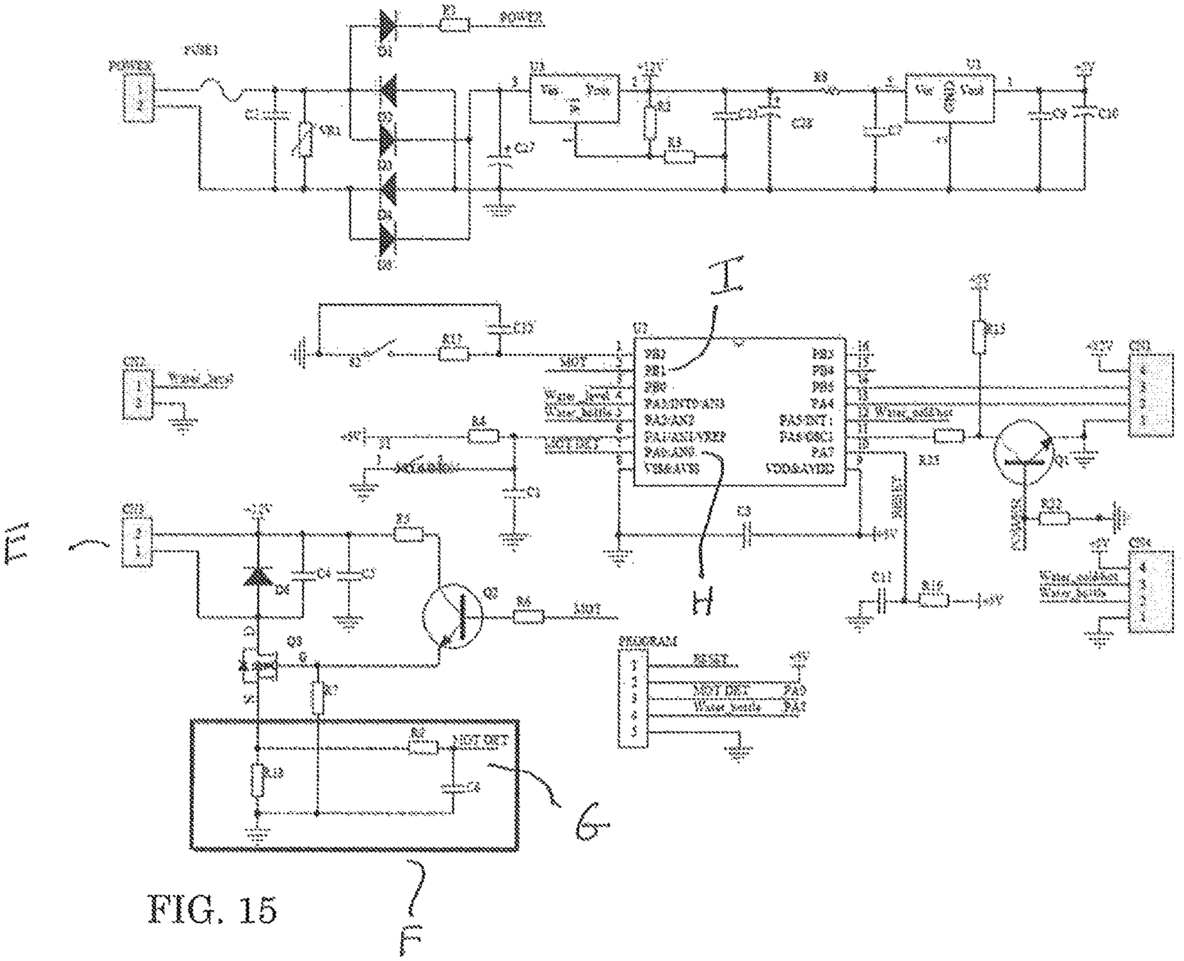
FIG. 15 is a schematic view of the printed circuit board ("PCB") layout of the control system of a preferred embodiment achieving the hand free filling or refilling of one or more reservoirs of a liquid dispenser.

Referring to FIG. 15, a preferred printed circuit board (PCB) layout of a control system for monitoring the amperage level of pump motor 100 is illustrated. Pump motor 100 is operably connected to element E of the PCB layout shown in FIG. 15. The components in the rectangular box in FIG. 15 designated by reference letter F are the preferred components that continuously detect the pump motor amperage level during the hands free auto-filling of the reservoir 4 and/or reservoir 24.

The MOT DET of FIG. 15 designated by reference letter G representing an amperage level of pump 100 during the auto-filling process is continuously compared to the preset value of pump motor amperage known to element MOT DET 7 PA0/AN0 designated by reference letter H. When MOT DET representing the amperage level of pump motor 100 designated by reference letter G reaches or exceeds the preset amperage level or value of pump motor 100, MOT 7 PB1 designated by reference letter I shuts off or deactivates pump 100 preventing flow of water from the water source to water manifold 2.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. A water dispensing assembly for a liquid dispenser for dispensing one or more consumable liquids, said water dispensing assembly comprising:

(a) a water manifold including a water inlet port, a first water reservoir, a first water outlet port and a second water outlet port, said water inlet port is configured to receive water from a water source operably connected to said water manifold when said water manifold is installed in an operating position, said water manifold is configured to direct water entering said water inlet port to said first water reservoir and said second water outlet port, said first water outlet port being connected to said first water reservoir to receive water from said first water reservoir; and, (b) a first venting assembly including a float valve and a housing for housing said float valve, said housing further including a vent port, said housing of said first venting assembly is fluidly connected to said first water reservoir such that during filling of said first water reservoir, said float valve moves between a first position in which said vent port is open and a second position in which said float valve closes said vent port when said first water reservoir is filled with water to a predetermined level.

2. The water dispensing assembly as set forth in claim 1, wherein:

(a) said second water outlet port is connected to a second water reservoir when said water dispensing assembly is installed in the operating position in the liquid dispenser, said second water reservoir being connected to a second venting assembly including a float valve and a housing for housing said float valve of said second venting assembly.

3. The water dispensing assembly as set forth in claim 2, wherein:

(a) said water manifold includes one or more flow control members for directing water entering said water inlet port to said second water outlet port so that said second water reservoir is filled prior to said first water reservoir.

4. The water dispensing assembly as set forth in claim 1, wherein:

(a) said float valve of said first venting assembly is a float ball, said venting assembly housing includes an inwardly extending lip to prevent said float ball from falling into said first reservoir.

5. The water dispensing assembly as set forth in claim 4, wherein:

(a) said housing of said first venting assembly is configured to cause said float ball to move upwardly in a substantially vertical path from a lowermost position in said housing of said first venting assembly as a level of water moves upwardly in said first water reservoir during filling of said first water reservoir.

6. The water dispensing assembly as set forth in claim 5, wherein:

(a) said water manifold including the water inlet port, the first water reservoir, the first water outlet port and the second water outlet port and said first venting assembly including said float ball, said vent port and said housing of said first venting assembly are removable from the liquid dispenser as a single unit.

7. The water dispensing assembly as set forth in claim 1, wherein:

(a) said water manifold includes at least one baffle for preventing water entering said first water reservoir from inadvertently raising the float valve of said first venting assembly to a position not indicative of a level of water in said first water reservoir.

8. The water dispensing assembly of claim 7, wherein:

(a) a lowermost portion of said at least one baffle is disposed below a lowermost portion of said float valve when said float valve is in a lowermost position.

9. The water dispensing assembly as set forth in claim 1, wherein:

(a) said water manifold including the water inlet port, the first water reservoir, the first water outlet port and the second water outlet port and said first venting assembly including said float valve, said vent port and said housing of said first venting assembly are removable from the liquid dispenser as a single unit.

10. A method of hands free auto-filling of one or more water reservoirs of a liquid dispenser for dispensing one or more consumable liquids, said method comprising the steps of:

(a) providing a liquid dispenser for dispensing one or more consumable liquids, the liquid dispenser having a water dispensing assembly including a water inlet port, a first water reservoir and a first water outlet port, the water inlet port is configured to receive water from a water source operably connected to said water dispensing assembly, said water dispensing assembly is configured to direct water entering said water inlet port to said first water reservoir, said first water outlet port being connected to said first water reservoir to receive water from said first water reservoir, said liquid dispenser further including a first venting assembly including a float valve and a housing for housing said float valve, said housing of said first venting assembly further including a vent port, said housing of said first venting assembly is fluidly connected to said first water reservoir such that during filling of said first water reservoir said float valve moves between a first position in which said vent port is open and a second position in which said float valve closes said vent port when said first water reservoir is filled with water to a predetermined level;

(b) automatically directing water from the water source to said water manifold so that water passes through said water inlet port and enters said first water reservoir to fill or refill said first water reservoir;

(c) while water is being directed into said first water reservoir, monitoring at least one condition of said liquid dispenser that changes as said float valve moves between said first position and said second position as a water level in said first water reservoirs changes; and, (d) automatically discontinuing water flow to said first water reservoir when the at least one condition being monitored indicates that the float valve is in the second position closing the vent port.

11. The method of claim 10, wherein:

(a) the at least one condition of said liquid dispenser is pump amperage level of a pump pumping water from the water source to said first water reservoir.

12. The method of claim 10, wherein:

(a) the float valve is operably connected to and positioned above a cold water reservoir of the liquid dispenser.

13. The method of claim 10, wherein:

(a) the float valve is operably connected to and positioned above a hot water reservoir of the liquid dispenser.

14. The method of claim 10, further including the steps of:

(a) providing the liquid dispenser for dispensing one or more consumable liquids with a second water reservoir having an inlet port for receiving water from said first reservoir, a second water outlet port for dispensing a consumable liquid different in at least one respect from the consumable liquid dispensed from the liquid dispenser from said first reservoir, and a second venting assembly including a float valve and a housing for housing said float valve, said housing of said second venting assembly further including a vent port, said housing of said second venting assembly is fluidly connected to said second water reservoir such that during filling or refilling of said second water reservoir said float valve moves between a first position in which said vent port is open and a second position in which said float valve closes said vent port when said second water reservoir is filled or refilled with water to a predetermined level.

15. The method of claim 14, including the further steps of:

(a) filling said second water reservoir prior to filling said first water reservoir.

16. The method of claim 15, wherein:

(a) said second water reservoir is a hot water reservoir and said first water reservoir is a cold water reservoir.

17. The method of claim 10, including the further step of:

(a) directing water into said first water reservoir such that water entering said first water reservoir does not cause said float valve to move to a position that is not indicative of a level of water in said first reservoir.

18. A liquid dispenser for dispensing at least two different consumable liquids, said liquid dispenser comprising:

(a) a liquid dispenser housing for housing a water manifold including a water inlet port, a first water reservoir, a first water outlet port and a second water outlet port, the water inlet port is configured to receive water from a water source operably connected to said water manifold, said water manifold is configured to direct water entering said water inlet port to said first water reservoir and said second water outlet port, said first water outlet port being connected to said first water reservoir to receive water from said first water reservoir to dispense a first consumable liquid from said liquid dispenser;

(b) a first venting assembly including a float valve and a housing for housing said float valve, said housing of said first venting assembly further including a vent port, said housing of said first venting assembly is fluidly connected to said first water reservoir such that during filling of said first water reservoir said float valve moves between a first position in which said vent port is open and a second position in which said float valve closes said vent port when said first water reservoir is filled with water to a predetermined level;

(c) said second water outlet port being connected to a second water reservoir to supply water to said second water reservoir;

(d) a second venting assembly including a float valve and a housing for housing said float valve, said housing of said second venting assembly further including a vent port, said housing of said second venting assembly is fluidly connected to said second water reservoir such that during filling of said second water reservoir said float valve moves between a first position in which said vent port is open and a second position in which said float valve closes said vent port when said second water reservoir is filled with water to a predetermined level; and, (e) a control system for monitoring at least one condition of the liquid dispenser that varies with movement of the float valve of at least one of the first venting assembly and the second venting assembly to automatically shut off the flow of water to the water manifold when the float valve of at least one of the first venting assembly and the second venting assembly is in the second position.

19. The liquid dispenser of claim 18, wherein:

(a) said water manifold including a water inlet port, a first water reservoir, a first water outlet port and a second water outlet port and said first venting assembly are removable from the liquid dispenser as single unit.

20. The liquid dispenser of claim 19, wherein:

(a) said first water reservoir is a cold water reservoir and said second water reservoir is a hot water reservoir;

(b) said water manifold is configured to direct water from the water source into said second water reservoir to fill said second water reservoir prior to filling of said first water reservoir; and, (c) configuring said liquid dispenser such that water entering said first water reservoir does not inadvertently raise said float valve of said first venting assembly to a position that is not indicative of a water level in said first water reservoir.

21. A removable water dispensing assembly for a liquid dispenser for dispensing one or more consumable liquids, said removable water dispensing assembly comprising:

(a) a water manifold and a water reservoir operably connected to said water manifold to receive water from said water manifold; and, (b) a float valve operably connected to said water reservoir and configured to indicate a level of water in said water reservoir, wherein the water manifold, the water reservoir and the float valve are removable as a single unit from the liquid dispenser.

* * * * *